J. H. STILLWAGGON.
FIRE HOSE SUPPORT.
APPLICATION FILED SEPT. 30, 1915.
1,233,615.
Patented July 17, 1917.
2 SHEETS—SHEET 1.
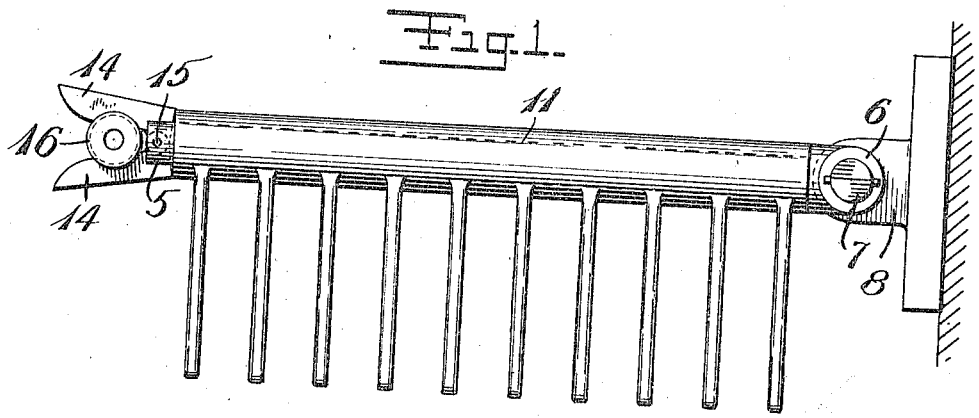
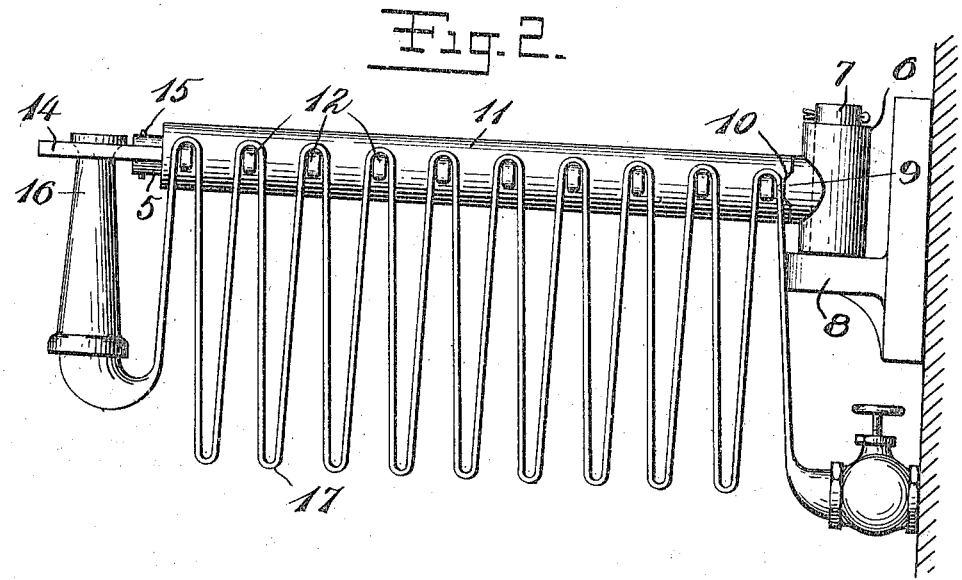
John H. Stillwaggon, Inventor
By his Attorney Frank J. Kent

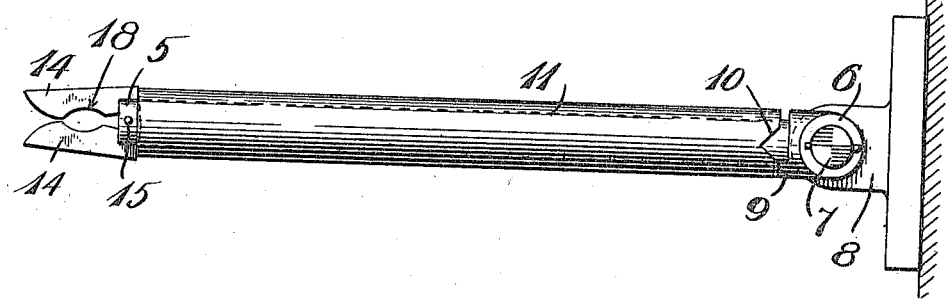
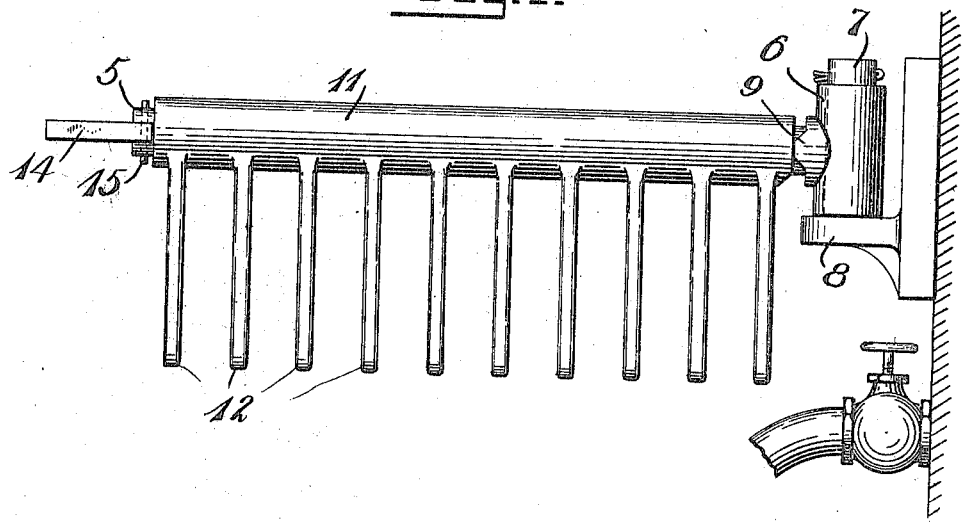

UNITED STATES PATENT OFFICE.

JOHN H. STILLWAGGON, OF RICHMOND HILL, NEW YORK.

FIRE-HOSE SUPPORT.

1,233,615.  Specification of Letters Patent.  Patented July 17, 1917.

Application filed September 30, 1915. Serial No. 53,269.

*To all whom it may concern:*

Be it known that I, JOHN H. STILLWAGGON, a citizen of the United States, residing at Richmond Hill, in the county of Queens and State of New York, have invented certain new and useful Improvements in Fire-Hose Supports, of which the following is a specification.

This invention relates to hose supports for fire-hose and the like, adapted to support a hose and its nozzle in compact and substantially coiled condition, and which in cases of emergency may be operated to precipitate the hose to the floor in automatically uncoiled condition, ready for use. To this end the invention includes a rod or other primary support, suitably and preferably pivotally connected to a wall or the like, a sleeve surrounding the rod and rotatable about the same, and also longitudinally slidable with respect to it. This sleeve carries a number of hose supporting fingers, from which the loops of the hose are suspended, and the sleeve and the rod have portions which, when the sleeve is slid to one position longitudinally of the rod, are interengaged to hold them against relative rotation. This locking position is maintained by means controlled by the nozzle of the hose, and acting upon the sleeve.

One of the objects of the invention is to provide a device having the general characteristics mentioned above, which is extremely simple in its construction and, therefore, cheap to manufacture, while it is very certain in its operation.

Another object is to provide an improved form of nozzle controlled lock for the rotatable member or sleeve which carries the hose supporting fingers.

Other objects and aims of the invention, more or less broad than those stated above, together with the advantages enumerated, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as a part of this specification, and in which I have shown a merely preferred form of embodiment of the invention, Figure 1 is a top plan view of a device embodying the invention showing the sleeve and fingers in the hose supporting position and with the parts locked. Fig. 2 is a side elevation of the same, illustrating also the hose in place. Fig. 3 is a view similar to Fig. 1, but showing the parts in the alternative position, and Fig. 4 is a view similar to Fig. 2, but with the parts in the position of Fig. 3.

Referring to the numerals on the drawings there is shown at 5 a rod, having a T-head 6 pivoted as indicated at 7 to a wall bracket or the like 8. This rod 5 is provided with a cam portion 9, which is intended to coöperate with a corresponding cut-out portion 10 of a sleeve 11, which surrounds the rod 5. This sleeve 11 has attached thereto or integral therewith a plurality of hose supporting fingers 12. The rod 5 at its farther end is provided with a pair of jaws 14, pivoted as indicated at 15. Between these jaws is intended to be inserted the nozzle 16 of the hose 17, and jaws having cut-out portions 18 for holding the nozzle in place after it is brought to position (see Fig. 3). The rear ends of these jaws 14 abut against the end of the sleeve 11, and when the jaws are forced apart to the Fig. 1 position, they drive the sleeve 11 along the rod 5 from the Fig. 3 position to the Fig. 1 position, and provided, of course, that the sleeve 11 has been partially rotated so as to bring the cam portions 9 and 10 into alinement. This results in the locking of the sleeve in the position shown in Figs. 1 and 2, after which the hose may be looped over the fingers 12 as indicated in Fig. 2.

When it is desired to use the hose in an emergency it is necessary merely to pull out the nozzle from the jaws 14, whereupon the weight of the hose on the fingers 12 will tend to rotate the sleeve 11 on the rod 5, and on account of the cam surfaces 9 and 10 the sleeve will move longitudinally of the rod until these portions 9 and 10 are disengaged, whereupon the sleeve turns to the Fig. 4 position, discharging the hose to the floor ready for use.

It will be understood that by providing cam portions 9 diametrically opposite each other on the rod 5, the sleeve 11 with its fingers 12 may be turned to either side, so that the adaptability of the device is considerably increased. Furthermore it will be understood that the particular location of the cam portions 9 and 10 is not important, and that other details of the construction may be varied as occasionally required without departing from the invention.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

What I claim is:

1. In a device of the kind described, a sleeve provided with hose supporting fingers, a rod about which the sleeve is rotatable and along which it is slidable, and means carried by one of said members for holding them in a given relation, said means comprising a pair of jaws pivoted to one of said members and engaging the other.

2. In a device of the kind described, a sleeve member and a rod member surrounded by the sleeve, one of said members being provided with hose supporting fingers, said members being relatively longitudinally and rotatively movable and having portions interengaging when the members are in a given relative longitudinal and rotative position, and means engaging one of said members to hold said members in said given relation.

3. In a device of the kind described, a sleeve member and a rod member surrounded by the sleeve, one of said members being provided with hose supporting fingers, said members being relatively longitudinally and rotatively movable and having portions interengaging when the members are in a given relative longitudinal and rotative position, and means coöperating with both of said members to hold said members in said given relation.

In testimony whereof I affix my signature.

JOHN H. STILLWAGGON.

Copies of this patent may be obtained for five cents each, by addressing the "Commissioner of Patents, Washington, D. C."